United States Patent [19]
Shaw

[11] 3,758,897
[45] Sept. 18, 1973

[54] AMPHIBIOUS CAMPER

[76] Inventor: Robert H. Shaw, 131 Oakwood Ln., Ithaca, N.Y. 14850

[22] Filed: Sept. 6, 1972

[21] Appl. No.: 286,745

Related U.S. Application Data

[63] Continuation-in-part of Ser. No. 138,613, Feb. 29, 1971.

[52] U.S. Cl. .................... 9/1 R, 296/23 MC
[51] Int. Cl. ............................. B63c 13/00
[58] Field of Search .............. 9/1 R, 1 T, 2 F; 114/61, 66.5 F, 66.5 R; 115/1 R; 296/23 R, 23 A, 23 B, 23 C, 23 MC

[56]  References Cited
UNITED STATES PATENTS

| | | | |
|---|---|---|---|
| 3,308,782 | 3/1967 | Dahl | 115/1 R |
| 3,436,774 | 4/1969 | Schmitz | 9/1 T |
| 2,992,444 | 7/1961 | Schuler | 9/1 T |
| 3,522,967 | 8/1970 | Platt | 9/1 R |
| 3,061,845 | 11/1972 | Gerbracht | 9/2 F |
| 3,172,134 | 3/1965 | Livingstone | 114/61 |
| 3,414,916 | 12/1968 | Martin et al. | 9/1 T |

Primary Examiner—George E. A. Halvosa
Assistant Examiner—E. R. Kazenske
Attorney—Herbert M. Birch et al.

[57] ABSTRACT

A process and equipment for transferring a standard truck conforming camper body from the truck onto a pontoon raft at a suitable shore location of a body of water, such as a river, lake, sea or ocean to convert the camper to serve as a houseboat. Also, the structural features of the camper body and the pontoon raft are so arranged, formed and structurally equipped as to provide for the complete transfer of the camper to the pontoon raft for transformation into a houseboat by one man working alone.

4 Claims, 8 Drawing Figures

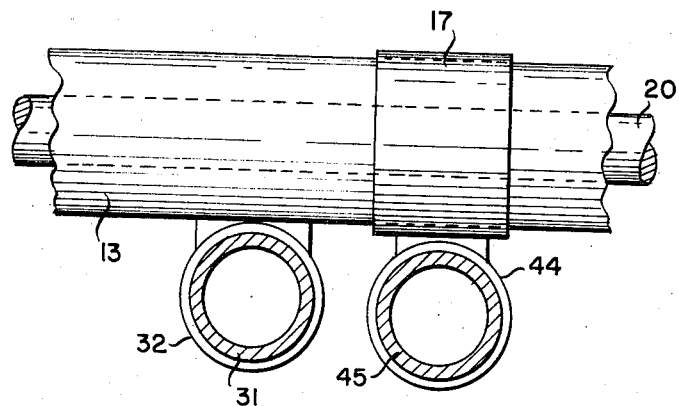
Fig. 6
Fig. 7
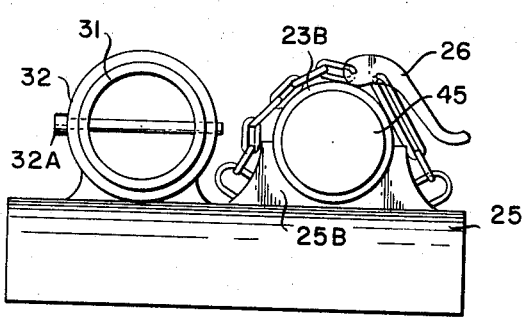
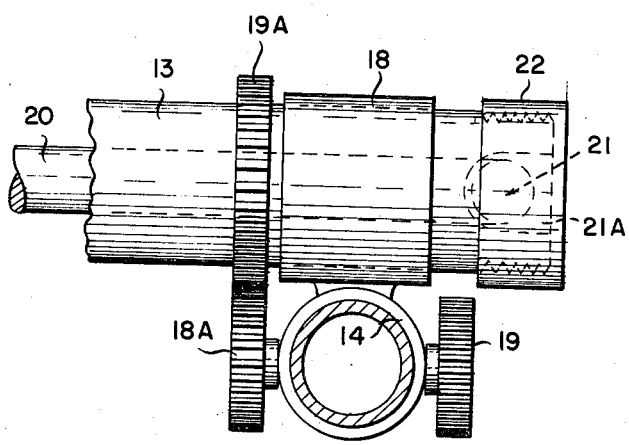
Fig. 8

AMPHIBIOUS CAMPER

This invention is a continuation-in-part of my prior co-pending U.S. Pat. application, Ser. No. 138,613, filed Apr. 29, 1971, for Transporting And Launching Arrangements For Amphibious Campers and is an improvement of my application Ser. No. 12,935, now U.S. Pat. No. 3,657,751, issued Apr. 25, 1972 for Amphibious Camper.

For example, my prior co-pending application includes a retractable wheel carriage to provide for land and highway travel of the pontoon raft and to facilitate launching from land to water and vice versa when the wheels are lowered. Such retractable wheel carriage is used with the present pontoon raft.

An object of my present invention is to provide an improvement in lowering and raising the pontoons of the raft to receive the camper body to respective flotation position with respect to water and to raised highway travelling position on its wheel carriage after the camper body has been truck mounted, by a simple torque spring rod armed to bias tension against the weight of each pontoon at an intermediate position in the path of the arc of travel of the respective pontoons during lowering and raising positions, to thereby facilitate one man operation.

Another object of my invention is to provide for maximum safety of the pontoon raft and all rigging parts thereof when travelling on a highway with the wheel carriage lowered by elimination of all side protruding parts from lateral extension outboard of the main side portions of the pontoon raft.

Still another object is to provide novel improved stability of the raft pontoons during the lift or raising operation of the pontoons by promoting an intermediate two arm lift between the respective raft sides and the pontoon, connecting saddles.

Another object is to provide a novel more economical and simple structural operation and connection for the respective ends of the torque spring rod, whereby more cumbersome and exensive means, such as clutch means and the like are eliminated, and all operating power is directed along a straight line of force by simple torque action in an elongated spring rod for each pontoon on each respective side of the raft deck connected to the pontoon lift arms.

A further object is to provide a novel process of transforming a camper into a houseboat, said process being practiced, for example, in a two step sequence by forward movement of the pontoon raft after the truck camper body has been removed from the truck and suitably supported by jack means for transfer to the pontoon raft deck with the pontoons at each side of the raft lowered to flotation position and whereby the pontoon lifting arms and connections, as a second step is initiated, are selectively removed and repositioned with respect to said jack means supporting the camper body, whereby the pontoon raft and its repositioned lifting arms are free to be moved forward under the camper body without abutment with said jack means to a final position, the camper body jacks may be operated to lower the camper body onto the pontoon raft deck, and the jacks stored for future use.

With these and other objects in view, the present invention consists in the construction, arrangement and combinations of parts hereinafter described and particularly defined in the appended claims, it being understood that it is not intended to be limited to the details of construction.

In the drawings like parts throughout the several views are given like numerals and are thus identified in the following detailed description:

FIG. 1 is an assembled perspective view of a pontoon raft with a camper body mounted in position on the raft deck and having a portion of the deck broken away to show the front and rear jacks at one side of the assembly before they are removed after the camper body has been transferred to the raft deck;

FIG. 2 is a perspective view of the pontoon raft with the camper body removed, but showing the lower portions which attach to side brackets of the jacks shown in FIG. 1 and support the camper body above ground level in solid and dotted lines to thus illustrate the respective positions of the supporting jacks as the raft is pulled into position under the camper body and the load and lift arms are selectively removed during the loading to provide a clear and unobstructed path between the side frame bars and the inboard sides of the pontoon as the raft is pulled to proper position under the camper body and subsequent removal of the jacks;

FIG. 6 shows the raft connections for the intermediate pontoon load arm and lift arm prior to connection with the pontoon saddle means;

FIG. 7 is a cross section view of the pontoon load and lift arms of FIG. 6 showing their connection to the pontoon saddle; and FIG. 8 is a partial view in side elevation of the torque rod, side frame and bearing sleeve end connections with the ratchet means used to turn and relax the tension of the torque spring rod.

Generally an important aspect of this invention resides in the novel operation of raising the pontoons from lowered floatation position to raised highway transport position by eliminating any clutch or substitute therefor as in the prior art. For example, it is to be understood that "highway position," "raised" and "fully up" refers to pontoons resting side by side upon the deck of the raft. The torsion spring rod is designed with strength and a degree of rotation, and so positioned and arranged, that it can provide lift of a desired and assigned percent of the weight of the pontoon off the deck when the pontoons are to be lowered to flotation position during the launch operation, or lift the pontoons from flotation position during the reverse operation. A ratchet may be provided and it is used only to supplement the spring action by increasing or decreasing spring action of the torsion spring rod in any position of the pontoon arm means rotation imparted by the pontoon raising or lowering operation.

It is a function of the ratchet to provide some slight rotation of the rotatable side frame axial member for each pontoon arm means, said direction of force depending on whether the torque spring rod is designed to carry more or less than 100 percent of the pontoon weight when the respective pontoons are at either end of their respective arcs of rotation or swing. The amount of additional or decreased rotation to be imparted to the rotatable side frame by the ratchet is that amount necessary to shift the stress from the center lift arm to the bow and stern load arms, thus relaxing the connection joints of the center lift arm assembly, whereby the lift arm can be quickly and easily removed so that it does not obstruct the camper body jacks during the operation of removing the camper body from the truck to the raft.

Figure 1:
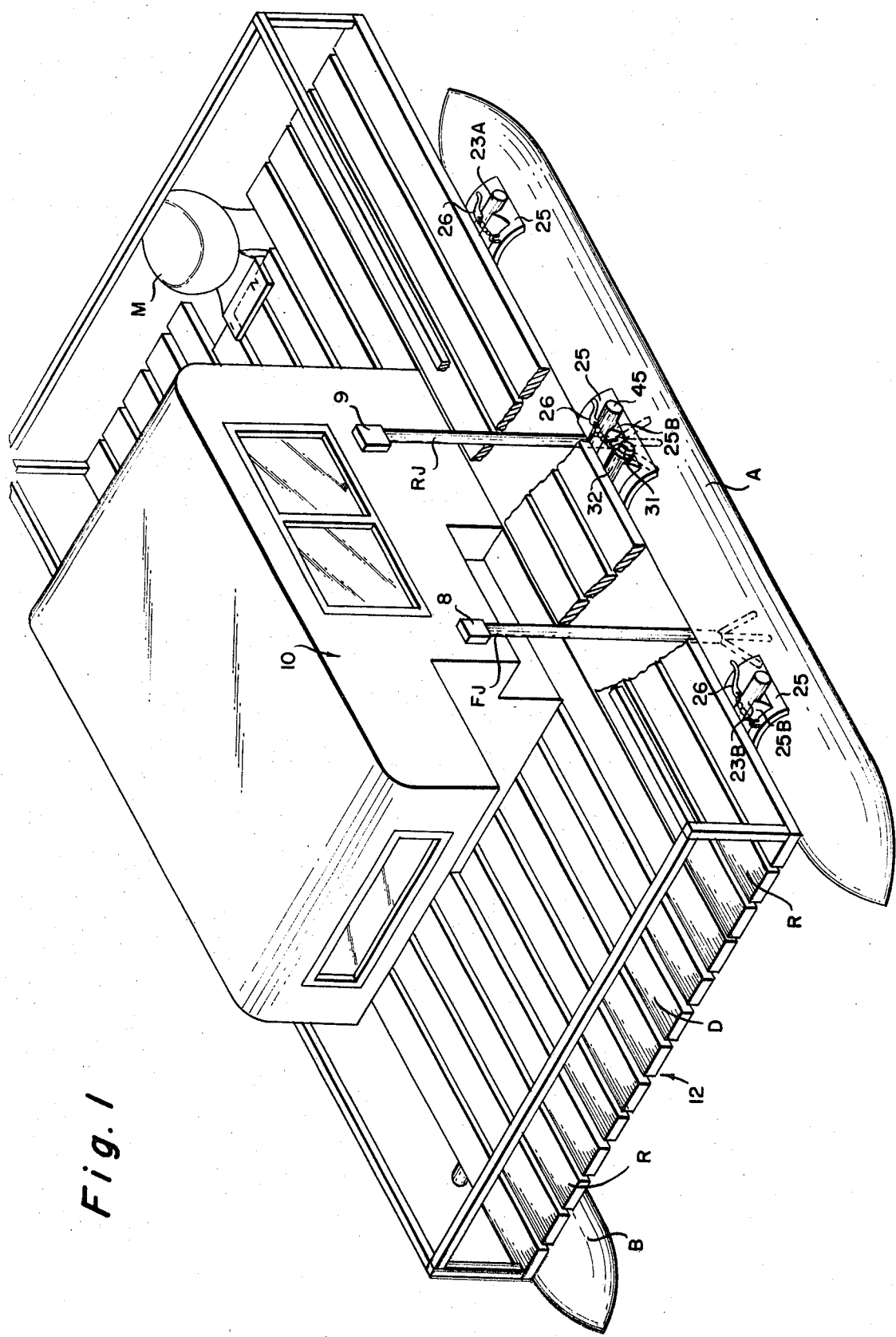

Referring in detail to the drawing and first with particular reference to FIG. 1, there is shown a camper body 10 removed from a truck, not shown, and supported by spaced apart extensible jack means FJ and RJ. These jack means are suitably connected to spaced bracket plates 8 and 9 spaced longitudinally along each side of the camper body 10 and when the jacks are extended they maintain the body 10 elevated to a previously calculated distance from a ground level which may be below water level, as shown in FIG. 1.

Figure 2:
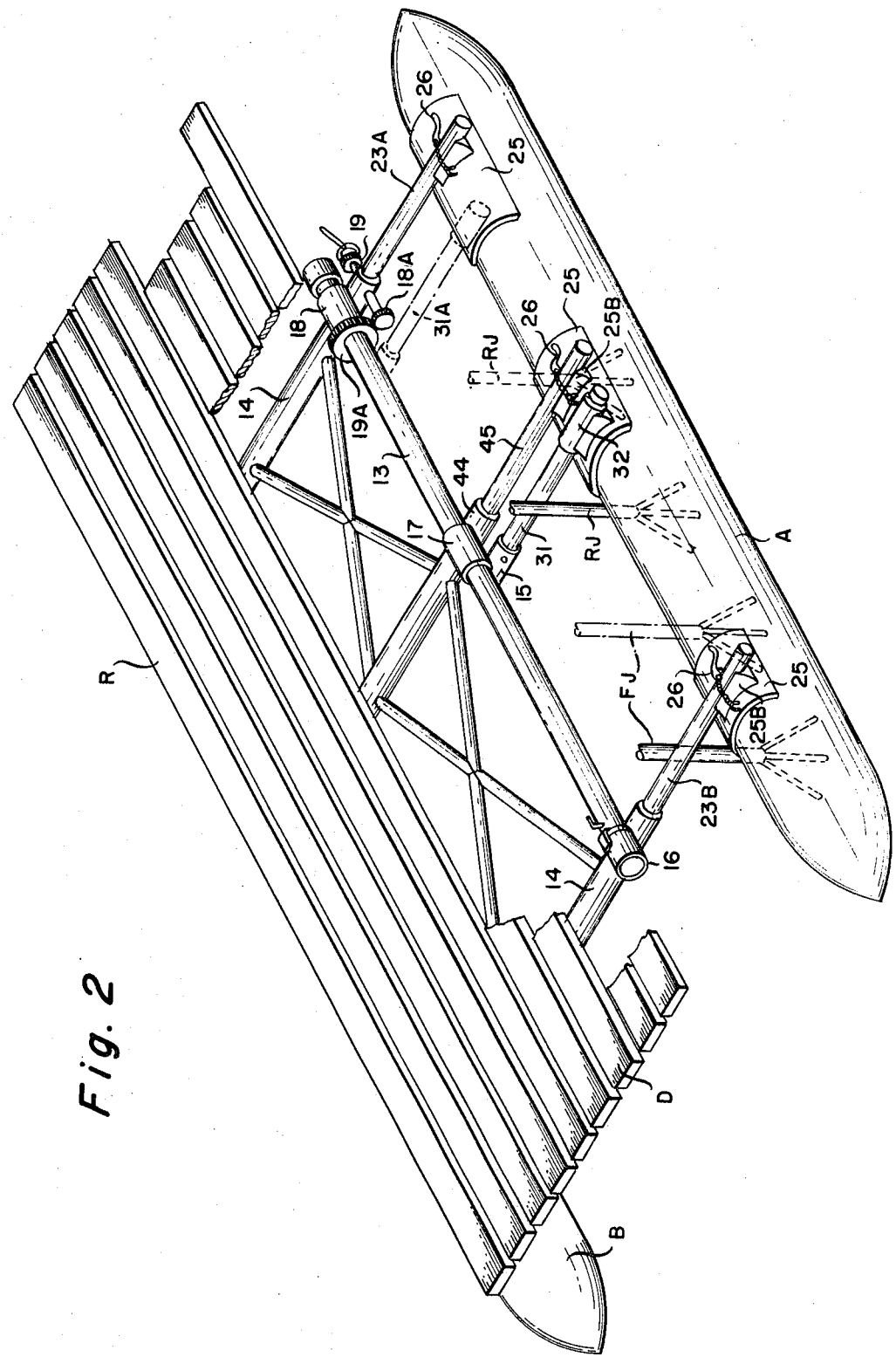

The pontoon raft 12 includes pontoons A and B with load arms 23A and 23B and lift arms 31 from each side of the raft frame 13, as shown in FIG. 2. The raft is shown loaded with the camper body 10 in FIG. 1 as it has been pulled forward to a position under the camper body, so the main deck D is directly under the camper body and the respective pontoon lift arms 31 and fore and aft load arms 23A and 23B have been removed and replaced selectively during the positioning step to permit the raft to come under the camper body without abutting interference with the vertical extended portions of the front and rear jack means FJ and RJ.

Also, shown in FIG. 1 are side deck portions R at each side of the main deck D, which may rest upon the lift arms 31 and the load arms 23A and 23B extending transversely between the side frame members 13 on each side of the main deck D, see FIG. 2. Then following the side deck placements, the jack means are lowered until the camper body rests its entire weight upon the pontoon main raft deck D and the jack means may then be removed and suitably stored until again needed. Also, at the rear or aft of the main deck D there may be secured in a manner well known in the art, an outboard motor M and the land wheels, not shown, may be retracted in their respective wheel wells for water travel.

In FIG. 2 is a partial perspective view of one side of the pontoon raft with the side decks removed to show the details of one side of the raft and its side frame member 13, end frame members 14, lift arms 31, with or without the optional lift arm 31A and the fore and aft load arms 23A and 23B and their respective bearing sleeves 14, 15 and 16 and sleeve mountings 16, 17 and 18 on the side frame members. This optional lift arm 31A is shown in phantom in FIG. 2. These novel bearing sleeves and mountings are hereinafter described more fully as the description proceeds.

An important novel feature of this invention resides in the formation of the elongated side frame members 13. These members are tubular with a hollow bore, which are novelly mounted in the sleeve bearings 16, 17 and 18 so as to be axially rotatable for two specific reasons, see FIGS. 2, 3 and 6. First, each side frame member 13 longitudinally houses an elongated torsion spring rod 20 with its forward end directed toward a bifurcated end in the provision of slot 47 in the peripheral rim portion of an internal sleeve bearing 49. This slot 47 is directed toward the end of the torsion spring rod 20 and formed to receive a T-headed pin 46 fixed transverse the end of the torsion spring rod 20 and formed to receive a T-headed pin 46 fixed transverse the end of the torsion spring rod 20, whereby when the pin 46 is inserted in the slot 47, this end of the torsion rod 20 is anchored to the end frame member 14 by the sleeve 16, 16A and pin 14A, see FIG. 3.

The torsion spring rod 20 has affixed to its opposite end in sleeve 18, see FIG. 8, a T crosshead or pin 21 splined onto the end of the torsion bar 20 at 21A during assembly in a fixed position, whereby at a predetermined angle with reference to the crosshead or pin 46 at the anchored opposite end of the torsion bar 20 any torque in the torsion spring rod 20 may be set in a relaxed neutral position when axial rotatable frame member 13 is turned into some predetermined rotational intermediate position between the swing arc of the pontoons A and B when fully down to floatation position and fully to up position. Thus the torsion spring 20 will exert torque lifting force from both fully down and fully up positions to provide assistance for one man operation.

The slot 21A in the end of axially rotatable frame member 13 is provided to receive the T-crosshead or pin 21, see FIG. 8. This serves to anchor the torsion spring rod 20 to the frame member 13 at the end opposite to the end anchored in slot 47 by pin 46. A cap 22 with internal threads on the terminal end of frame member 13 is provided and serves to retain the crosshead or transverse pin 21 in the slot 21A and in the splined end of rod 20.

A ratchet 19 with suitable lever and dog means 19A may be suitably attached to the end frame member 14 and is suitably mounted on a shaft to connect with a gear 18A keyed to a shaft journalled through 14 carrying the ratchet 19 and 18A which meshes with a gear 19A mounted on the rotatable side frame member 13. Manipulation of the ratchet 19 by a suitable lever means imparts axial rotational movement to the frame 13, thereby overcoming the resistance of the torsion spring rod 20. This ratchet is arranged and adjustable to operate or hold in either direction of spring torque at any angle of the spring rod 20 rotation.

The pontoons A and B are identical and their respective load arms 23A and 23B and intermediate lift arms 31 and the optional lift arm 31A are the same for each pontoon mounting to the rotatable side bars 13.

The lift arms 31 for each pontoon are fixed to the side bar 13 of the raft at each side and are rotatable with the side bar for up or down movement with its respective connected pontoon A or B. When the lift arm is engaged in the sleeve 32 and sleeve 15 and suitably fastened by suitable means, such as bolts 32A and 15A, rotation of side member 13 causes lift or lowering of an operatively connected pontoon.

Figure 5:
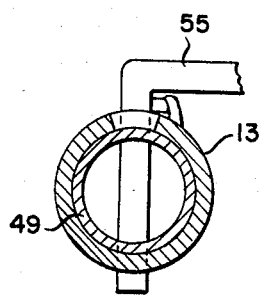
FIG. 5 is a section view taken on section line 5—5 of FIG. 3.

These pontoon lift arms 31 can be installed or removed only when the sleeves 15 and 32, see FIG. 2, are properly aligned such that there is no lateral binding of the arm in the mounting sleeves and no weight of the pontoon or raft resting on the lift arm 31. Relaxation of the torque rod 20 by the ratchet 19 to cause upward or downward position of the lift arm serves to shift any torque load from the lift arm to the respective fore and aft load arms 23A and 23B. Fine adjustment of the connections to control floatation is obtainable by use of a cam bolt 55, see FIGS. 3 and 5.

Figure 3:
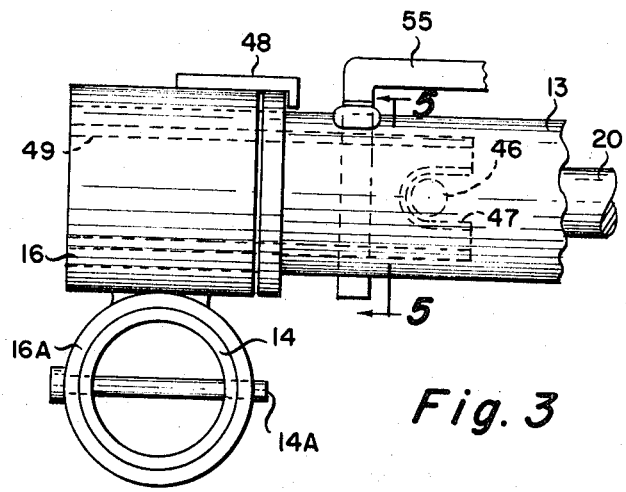
FIG. 3 is a partial view in side elevation of the aft end of the side frame member and its mounting in the bearing sleeve secured to the aft end frame and showing the torque spring end connection in the side frame member.
Figure 4:
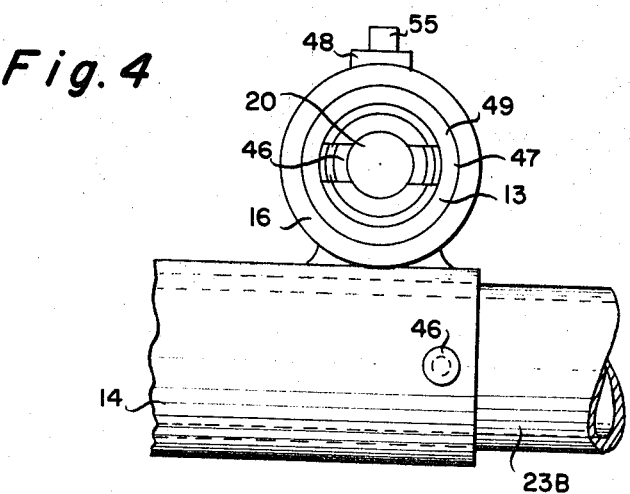
FIG. 4 is a front elevational view of the mountings for the torque rod in its side member and the bearing sleeve in which the end of the side member is mounted for rotation.

When the respective pontoons are down to floatation position, the load bearing arms 23A and 23B can be slidably engaged under a suitable clamp, such as clamp 26, see FIGS. 2 and 7, and into the end frame member 14 where such arms are locked by a bolt 14A, see FIG. 3. Since alignment of the end frame member 14 with pontoon saddle 25 may not be absolute or accurately provided when the weight of the pontoon is on the lift arm 31, the clamp 26 when operated, firmly seats load bearing arms 23A and 23B into suitable receptacle or cradle 25B on pontoon saddle 25.

In the sequence of transfer of the camper body 10 from the truck to the raft deck, the aft load arm 23A is installed in the pontoon saddle as soon as the respective pontoons A and B are lowered to a floatation position. The fore load arm 23B is not at this stage of the transfer set in place, thereby leaving an open space between the longitudinal edge of the main raft deck D and the inboard side of the associated pontoon in the area forward of the center of the raft deck side.

As shown in FIGS. 2 and 6, an additional intermediate load arm 45 holding means 44 and clamp 26 may be provided at bearing sleeve 17 and also an additional lift arm 31 in a sleeve 12 may be connected to side frame bar 13 if desired.

During the loading transfer sequence, as the raft is pulled under the camper body 10 elevated on vertical jacks FJ and RJ, the main deck D passes under the elevated camper body 10 between the jacks supporting the same and at the same time the pontoons A and B each move forward outside their respective jacks, until a jack RJ at each side of the camper body is obstructed by a lift arm 31 at each side of body 10. At this stage the position of the fore load arm 23B is in front of the camper body jack FJ. Accordingly, the fore load arm 23B may now be set in place without subsequent interference with the jacks as the loading of the camper body 10 onto the raft main deck D continues.

This is the first step of the two step loading operation and it should be noted that it is arranged so the fore to aft distance between load arms 23B and lift arms 31 is greater than the distance between the space between the front and rear camper jacks.

The aft load bearing arm 23A has remained set in place and now with both fore and aft load arms 23B and 23A in place, the ratchet 19 is adjusted to impart some rotation to the rotatable side members 13 through the gears 18 and 19A. This turning adjustment of the side members 13 causes rotational swing to be imparted to the lift arm 31 to relax its connection in sleeves 15 and 32, shown in FIG. 2, whereby the weight of a respectively connected pontoon is shifted to the fore and aft load arms 23B and 23A and any fine adjustments can be made by the cam bolt 55. The lift arms 31 may now be removed and provide a completely clear unobstructed area between the fore and aft load arms and between the outboard sides of the raft and the inboard sides of the pontoons A and B. This permits completion of the second step of the loading sequence as the raft may now be drawn further under the jack supported camper body 10 without obstruction by the camper jacks, until the raft is properly positioned under the camper and may now be lowered onto the raft main deck D.

A final load bearing arm 45 may now be inserted into sleeve member 44 carried by frame 13 and clamped to the respective pontoon saddles 25 by a clamp 26 in the manner described for load arms 23B and 23A and the pontoons are ready to float the raft in the water.

Finally, side decks R may be placed over the pontoons and suitable side rails along the main deck D and other essential gear is installed to complete the assembly and provide a houseboat.

Without further description it is believed that the foregoing is sufficiently complete, clear, concise and exact in terms to enable any person skilled in the art to practice this invention. However, it is to be expressly understood that although only one embodiment of my invention is described and illustrated in detail, that other arrangements and combinations of parts which may now occur to others are likewise intended to be covered hereby. To determine the scope of the present invention, reference should be had to the appended claims.

What is claimed:

1. A process for transforming a truck carried camper body into a houseboat comprising the following steps:
    raising the camper body from the truck by jack means connected with each side of the camper body;
    maintaining the camper body elevated from the ground at a suitable shore location with respect to a body of water;
    driving the truck forward from under the camper body while towing a pontoon raft having a deck portion and side pontoons, intermediate and rear lift means to raise and lower the raft pontoons so the deck portion may be moved forward under the camper body with the pontoons lowered by the lift means in floatation position to a pre-determined position, sequentially removing front and intermediate load arms and the intermediate lift means to avoid abutment with the jack means while moving the raft deck portion forward between the jack means and sequentially replacing the lift means and load arms after each of the lift means and load arms connection points have passed each respective jack means, and then lowering the camper body supporting jack means to permit the camper body to be transferred to the raft deck to provide a houseboat for launching from land to water.

2. A process as described in claim 1, wherein the pontoons are lowered to floatation position from a raised position by the said lift means manually with the assistance of an elongated torque rod, to thereby provide for a complete one man operation from start to finish.

3. In combination, a standard truck conforming camper body and a highway transportable raft with a main deck portion, a pontoon connectably spaced to each side of the deck, lift means each connected at one end to means carried by each respective pontoon and at the opposite end to sleeve bearings mounted on side frame members, a spring torsion rod supported in said sleeve bearings, said torsion rod being anchored at each end in a sleeve bearing carried by each end frame member and concentrically extending through each side frame member, said side frame members being axially rotatable to oscillate the lift means and swing the pontoons in an arcuate path up or down from floatation position or to a rest position on the deck of the raft, said spring torsion rods being axially and oppositely torque loaded to resist the weight of the pontoons as they move along said arcuate path to terminal positions from a predetermined point in the swing path of each pontoon, whereby torque resistance is imparted to lighten the gravity load of each pontoon to facilitate pontoon movement by a single operator.

4. The combination as described in claim 3, wherein said sleeve bearing has a bifurcated end in the provision of a slot adjacent the end of said spring rod, a pin transverse each opposite end of said spring rod and in the confines of said slot, whereby angle adjustment of said side member controls the torque of said spring rod for connection or disconnection of the pontoon lift arms.

* * * * *